(12) United States Patent
Saje et al.

(10) Patent No.: US 10,421,493 B2
(45) Date of Patent: Sep. 24, 2019

(54) MULTI-LAYERED LOAD PATH TORQUE BOX

(71) Applicant: GM GLOBAL TECHNOLOGY OPERATIONS LLC, Detroit, MI (US)

(72) Inventors: Robert N. Saje, Shelby Township, MI (US); John R. Sulik, II, Macomb, MI (US); Keith J. Saari, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 15/901,239

(22) Filed: Feb. 21, 2018

(65) Prior Publication Data
US 2019/0256147 A1 Aug. 22, 2019

(51) Int. Cl.
*B62D 21/15* (2006.01)
*B62D 25/02* (2006.01)
*B62D 21/02* (2006.01)

(52) U.S. Cl.
CPC ............. *B62D 21/15* (2013.01); *B62D 21/02* (2013.01); *B62D 25/025* (2013.01)

(58) Field of Classification Search
CPC .............................. B62D 21/02; B62D 21/025
USPC ....................................................... 296/187.1
See application file for complete search history.

(56) References Cited

U.S. PATENT DOCUMENTS

| 5,951,097 | A * | 9/1999 | Esposito | ............... | B62D 25/082 296/187.09 |
| 6,273,486 | B1 * | 8/2001 | Ezzat | ..................... | B62D 27/00 296/187.09 |
| 6,296,298 | B1 * | 10/2001 | Barz | ...................... | B62D 21/15 296/187.02 |
| 6,299,240 | B1 * | 10/2001 | Schroeder | .............. | B62D 21/02 296/203.01 |
| 9,365,245 | B2 * | 6/2016 | Donabedian | ........... | B62D 25/16 |

* cited by examiner

*Primary Examiner* — Pinel E Romain
(74) *Attorney, Agent, or Firm* — Quinn IP Law

(57) ABSTRACT

A torque box includes a box body extending along a longitudinal axis and a reaction wall coupled to the box body. The reaction wall is obliquely angled relative to the longitudinal axis to receive an offset load. The torque box further includes a plurality of ribs coupled to the reaction wall. Each of the plurality of ribs is oriented perpendicularly to the reaction wall to resist the offset frontal load received by the reaction wall. The torque box also includes a bridge rail coupled to the box body. The bridge rail is configured to allow load transfer between the frame rail and the rocker panel. At least a portion of the bridge rail is obliquely angled relative to the longitudinal axis.

20 Claims, 8 Drawing Sheets

MULTI-LAYERED LOAD PATH TORQUE BOX

INTRODUCTION

The present disclosure relates to multi-layered load path torque box. Specially, the present disclosure describes torque boxes including multiple layers for managing the load path when an external force is exerted on a vehicle.

SUMMARY

The presently disclosed torque box can be cast and includes multiple layers to manage external loads and to minimize noise and vibration. The layers of the torque box are optimized to manage offset loads (e.g., shallow offset loads). To do so, a lower layer of the torque box includes a reaction wall and a rib pattern. The upper layer of the torque box is optimized to manage full and offset frontal loads with a back-up wall and a rib pattern while a transitioning layer transfer loads from a frame rail to a rocker panel via 3-D shaped hollow/tubular bridge rail with ribs. The torque box minimizes part count in fewer joints, thereby minimizing the risk of joints separating. The presently disclosed torque box has multiple load paths cased in one part that significantly reduces tooling investment relative to other torque boxes. This casting manufacturing process enables efficient arrangement of multiple load paths in the torque box, thereby utilizing significantly less space than other torque boxes. As a result, the torque box provides: (1) multiple load paths; layered load paths; multi-layers and crossing rib patterns; 3-D cored tubular transition element with thickened corners and mass efficiency features (e.g., lightening holes); and allows manufacturing through a cast/core process.

In some embodiments, the torque box includes a box body extending along a longitudinal axis and a reaction wall coupled to the box body. The reaction wall is obliquely angled relative to the longitudinal axis to receive an offset load. The torque box further includes a plurality of ribs coupled to the reaction wall. Each of the plurality of ribs is oriented perpendicularly to the reaction wall to resist the offset frontal load received by the reaction wall. The torque box also includes a bridge rail coupled to the box body. The bridge rail is configured to allow load transfer between the frame rail and the rocker panel. At least a portion of the bridge rail is obliquely angled relative to the longitudinal axis. The torque box includes a first layer, and the first layer includes the reaction wall and the plurality of ribs. The first layer includes a rocker-panel socket sized to receive a rocker panel. The torque box includes a rail socket sized to receive a frame rail. The rail socket is spaced apart from the rocker-panel socket along a first direction. The first direction is parallel to the longitudinal axis. The rail socket is spaced apart from the rocker-panel socket along a second direction. The second direction is parallel to a transverse axis. The second direction is orthogonal to the first direction. The rail socket is spaced apart from the rocker-panel socket along a third direction. The third direction is parallel to a vertical axis. The third direction is orthogonal to the first direction and the second direction. The first layer includes a back-up wall, at least one of the plurality of ribs is directly coupled to the back-up wall, and each of the plurality of ribs is obliquely angled relative to the back-up wall. The first layer includes an energy-absorbing body coupled to the box body. The energy-absorbing body is elongated along a body axis, the body axis is parallel to the longitudinal axis, the body axis is spaced apart from the longitudinal axis along the transverse direction. The plurality of ribs may be referred to as a plurality of first ribs. The toque box further includes a plurality of second ribs, and each of the plurality of second ribs is parallel to the longitudinal axis. At least one of the plurality of second ribs crosses through at least one of the plurality of first ribs to enhance the structural integrity of the torque box. The torque box further includes a frontal wall directly coupled to the reaction wall. The reaction wall is obliquely angled to the frontal wall, the torque box further includes a back-up wall. The back-up wall is parallel to the frontal wall, at least one of the plurality of first ribs is directly coupled to the frontal wall, at least one of the plurality of first ribs is directly coupled to the back-up wall. At least one of the plurality of second ribs is directly coupled to the frontal wall. At least one of the plurality of second ribs is directly coupled to the back-up wall. The bridge rail includes corners, and at least one of the corners is thicker than a remaining of the bridge rail. The bridge rail has at least one lightening hole. The torque box further includes an energy-absorbing body coupled to the box body. The energy-absorbing body extends along a body axis. The longitudinal axis is parallel to the body axis. The thickness of the energy-absorbing body varies along the body axis to absorb energy from a straight front load exerted on the torque box.

The present disclosure also describes a vehicle that includes the torque box described above. The vehicle includes a frame rail and a rocker panel. The torque box interconnects the frame rail and the rocker panel.

The above features and advantages and other features and advantages of the present disclosure are readily apparent from the following detailed description of the best modes for carrying out the disclosure when taken in connection with the accompanying drawings.

DETAILED DESCRIPTION

Figure 1:
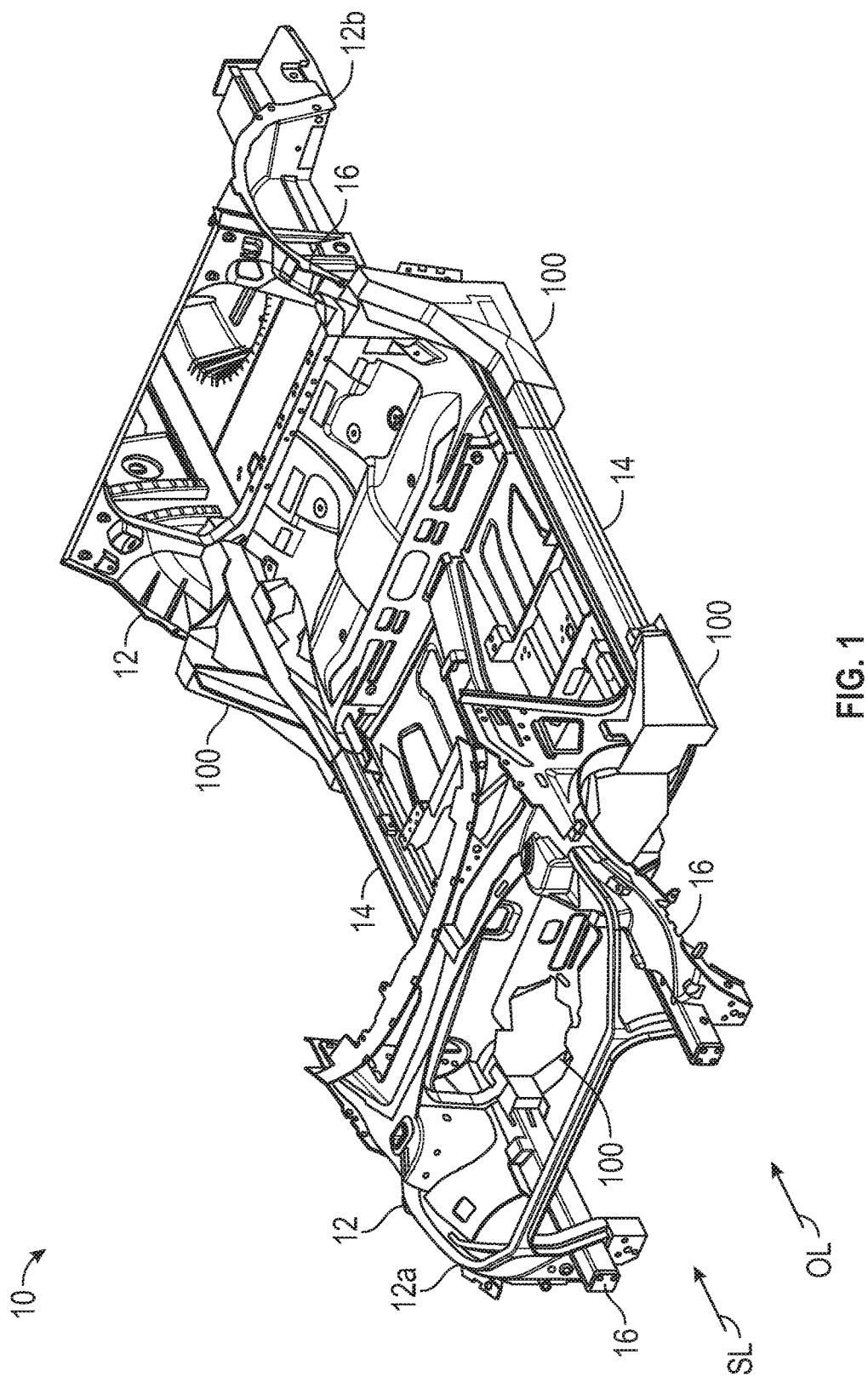
FIG. 1 is a schematic isometric view of a vehicle including a frame rails, a rocker panels, and torque boxes, wherein each of the toque boxes interconnects one frame rail and one rocker panel.
Figure 2:
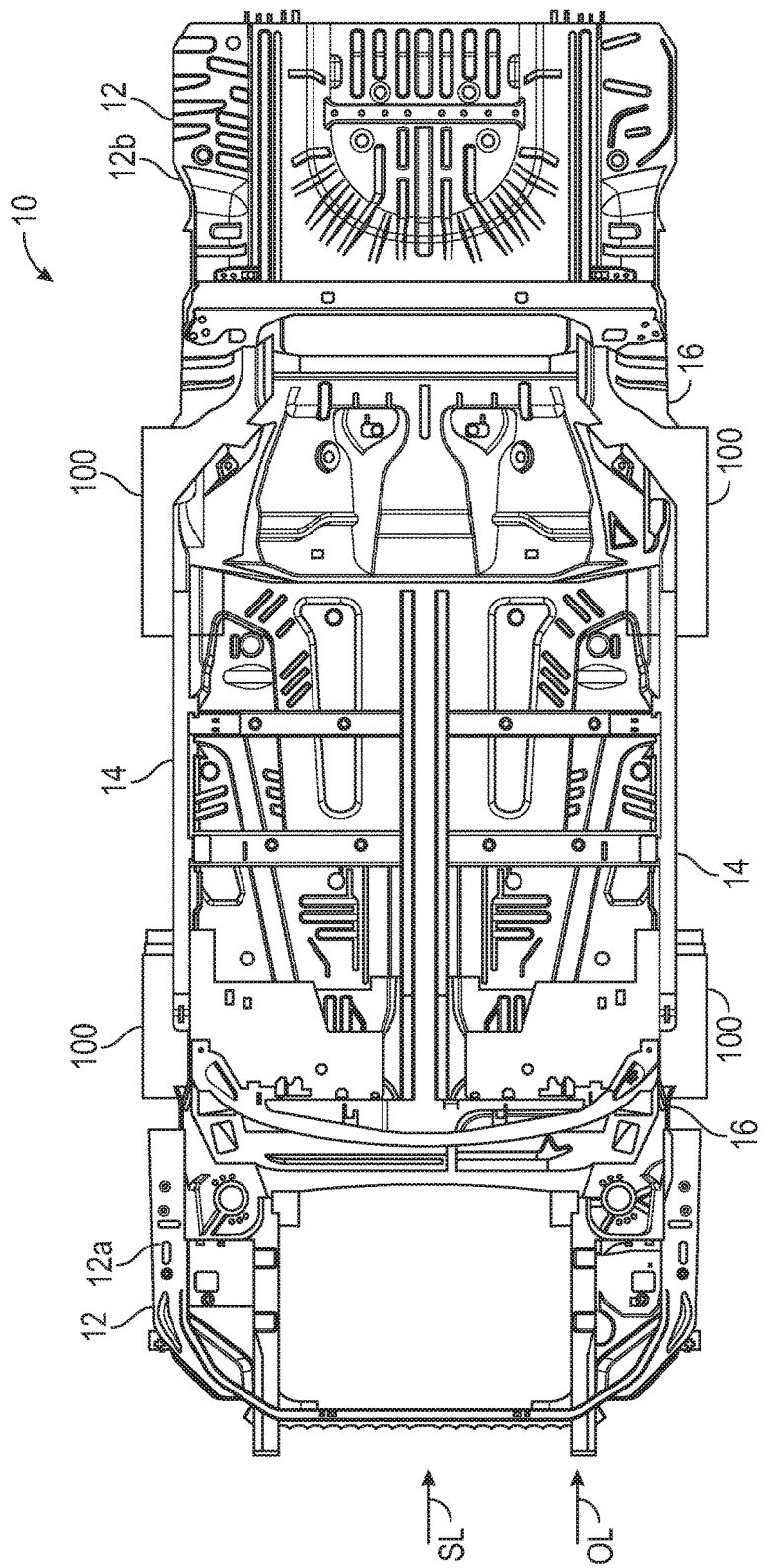
FIG. 2 is a schematic top view of the vehicle shown in FIG. 1.
Figure 3:
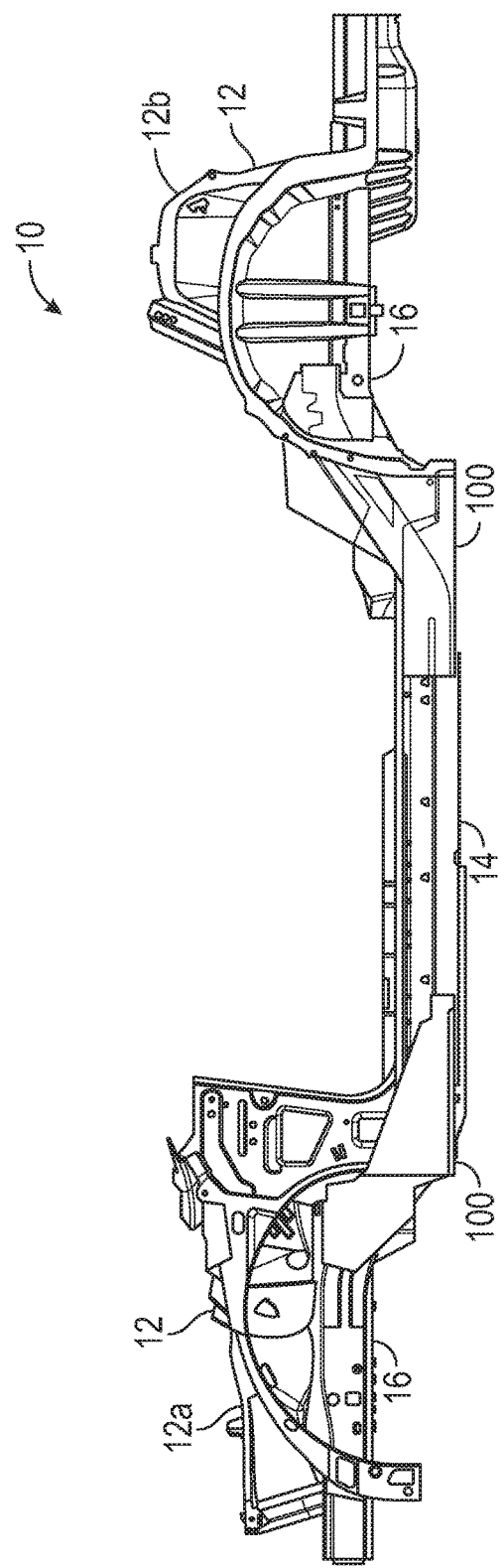
FIG. 3 is a schematic side view of the vehicle shown in FIG. 3.

With reference to FIGS. 1-3, a vehicle 10 includes a pair of frames 12, (i.e., a front frame 12a and a rear frame 12b) and at least two rocker panels 14 coupled between the pair of frames 12. Specifically, each of the rocker panels 14 is coupled between the front frame 12a and the rear frame 12b. Each of front frame 12a and the rear frame 12b includes at least one frame rail 16. The vehicle 10 further includes a plurality of torque boxes 100 for interconnecting frame rails and rocker panels. In the depicted embodiment, each torque box 100 directly interconnects one of the frame rails 16 to one of the rocker panels 14 to efficiently manage loads when a straight load SL or an offset load OL is exerted on the vehicle 10. In other words, each torque box 100 is directly coupled to one of the frame rail 16, and each torque box 100 is directly coupled to one of the rocker panel 14 to manage loads. Each torque box 100 may be made using casting and, therefore, is a one-piece structure to enhance its structural integrity.

Each torque box 100 includes multiple layers to manage loads when an external force is applied to the vehicle 10. For example, the torque box 100 manages and redirects loads when either a shallow offset frontal load (i.e., the offset load OL) or a straight frontal load (e.g., straight load SL) is exerted on the vehicle 10. In addition, the torque box 100 minimizes noise and vibration when the external force is applied to the vehicle 10. As discussed above, each torque box 100 directly interconnects one of the frame rails 16 and one of the rocker panels 14 to facilitate load transfer and management. As such, the external load (e.g., straight load SF or offset load OL) can be transferred from the frame rail 16 to the rocker panel 14 through the torque box 100.

Figure 4:
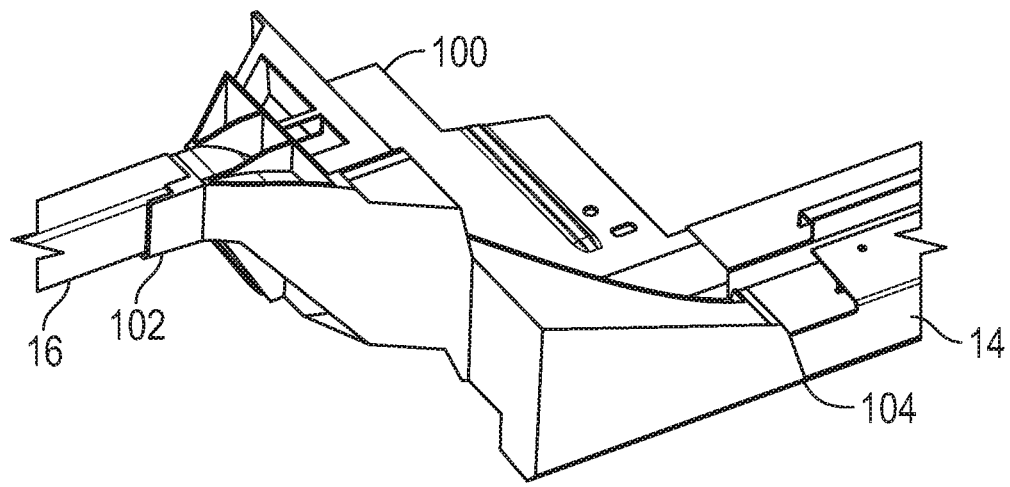
FIG. 4 is a schematic isometric view of the torque box shown in FIG. 1, depicting a frame rail partially disposed in a rail socket of the torque box, and rocker panel partially disposed in a rocker-panel socket of the torque box.
Figure 5:
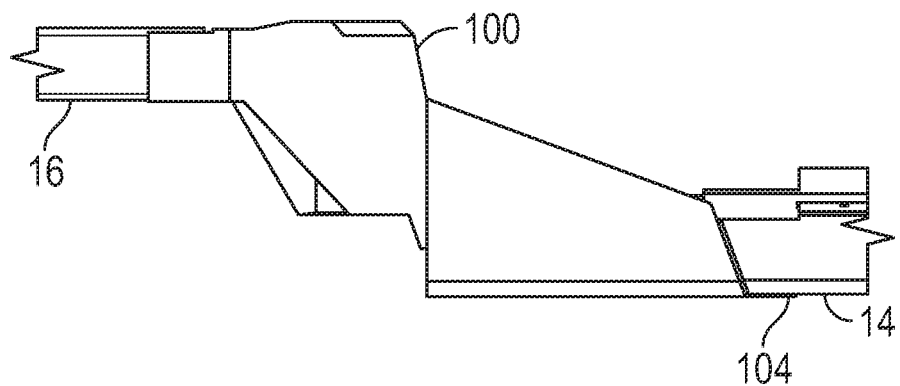
FIG. 5 is a schematic side view of the torque box shown in FIG. 1, depicting a frame rail partially disposed in a rail socket of the torque box, and rocker panel partially disposed in a rocker-panel socket of the torque box.

With reference to FIGS. 4 and 5, the torque box 100 incudes a rail socket 102 configured, shaped, and sized to receive the frame rail 16. The frame rail 16 is partially disposed inside the rail socket 102 to couple the torque box 100 to the frame rail 16. The torque box 100 further includes a rocker-panel socket 104 configured, shaped, and sized to receive the rocker panel 14. The rocker panel 14 is partially disposed inside the rocker-panel socket 104 to couple the torque box 100 to the rocker panel 14.

Figure 6:
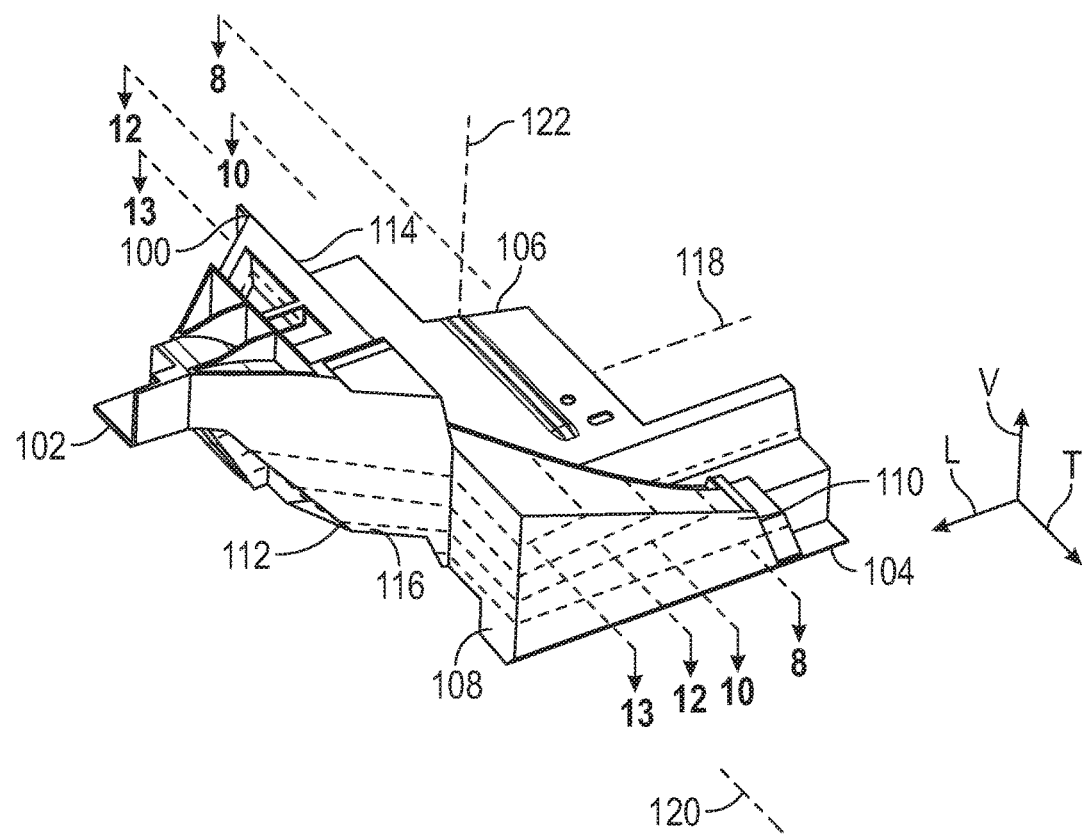
FIG. 6 is a schematic isometric view of the torque box, illustrating the layers of the torque box in dashed lines.
Figure 7:
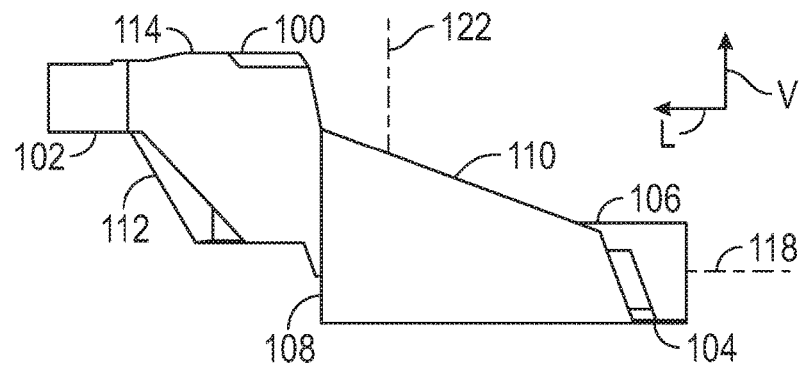
FIG. 7 is a schematic side view of the torque box, illustrating the layers of the torque box in dashed lines.

With reference to FIGS. 6 and 7, the torque box 100 is wholly or partly made of a substantially rigid material, such as aluminum or steel. As a non-limiting example, the torque box 100 may be made by casting a metallic material. Further, the torque box 100 includes a box body 106 having a plurality of layers, namely, a first or lowermost layer 108, a second or angled layer 110, a third layer 112, and a fourth or uppermost layer 114. The box body 106 extends along a longitudinal axis 118. The longitudinal axis 118 is parallel to a first or longitudinal direction L. The rail socket 102 is spaced apart from the rocker-panel socket 104 along the first direction L. The box body 106 also extends along a transverse axis 120. The transverse axis 120 is parallel to a second or transverse direction T. The rail socket 102 is spaced apart from the rocker-panel socket 104 along the second direction T. The second direction T is orthogonal to the first direction L. The box body 106 also extends along a vertical axis 122. The vertical axis 122 is parallel to a third or vertical direction V. The rail socket 102 is spaced apart from the rocker-panel socket 104 along the third direction V. The third direction V is orthogonal to the first direction L and the second direction T. The location and orientation of the rocker-panel socket 104 relative to the rail socket 102 (as described above) allows the torque box 100 to directly interconnect the rocker panel 14 and the frame rail 16, while facilitating and managing load transfer between the rocker panel 14 and the frame rail 16.

Figure 8:
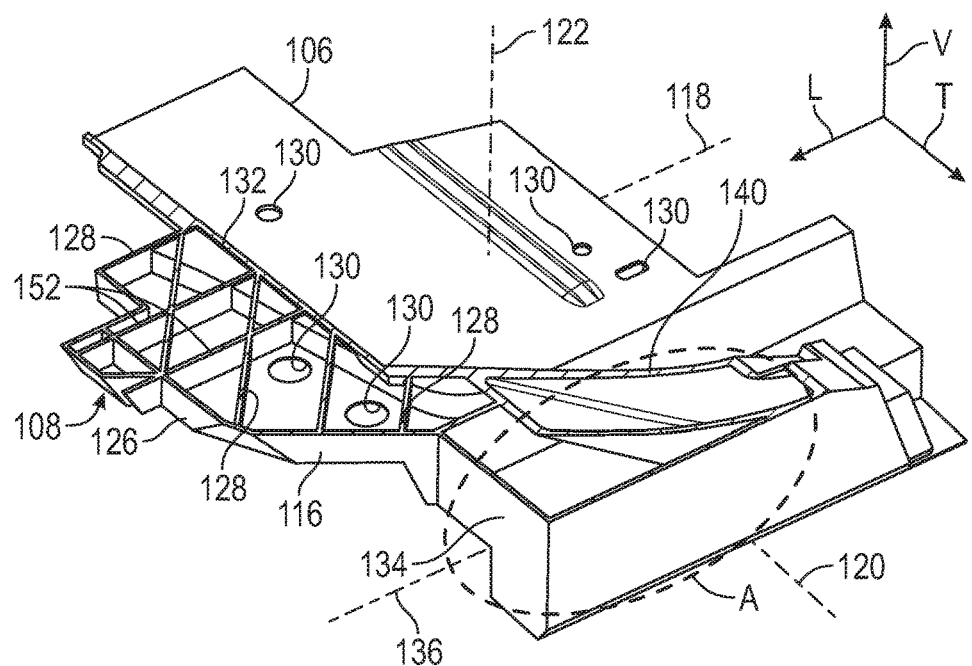
FIG. 8 is a schematic cross-sectional view of the torque box, taken along section line 8-8 of FIG. 6.

With reference to FIG. 8, the first layer 108 includes a reaction wall 116 coupled to the box body 106. The reaction wall 116 is obliquely angled to the longitudinal axis 118. As such, the reaction wall 116 is configured to receive an offset load OL (shown in FIG. 1 as a frontal offset load, but may be a rear offset load). As a non-limiting example, when the offset load OL is exerted on the vehicle 10 (FIG. 1), the tire of the vehicle 10 may impact the reaction wall 116 to redirect the offset load OL, thereby managing the loads exerted on the vehicle 10. In other words, upon receipt of the offset load OL, the reaction wall 116 increases the lateral acceleration of the offset load OL. To do so, as a non-limiting example, the angle from the reaction wall 116 to the longitudinal axis 118 may be between five degrees and forty-seven degrees. Optimally, the angle from the longitudinal axis 118 to the reaction wall 116 is seven degrees in order to increases the lateral acceleration of the offset load OL. The torque box 100 also includes a frontal wall 126 directly connected to the reaction wall 116. The reaction wall 116 is obliquely angled relative to the frontal wall 126. As a non-limiting example, the angle from the reaction wall 116 to the frontal wall 126 is between forty-three degrees and eighty-five degrees in order to increases the lateral acceleration of the offset load OL. Optimally, the angle from the reaction wall 116 to the frontal wall may be eighty-three degrees in order to increases the lateral acceleration of the offset load OL. The torque box 100 further includes a plurality of first ribs 128. Each of the first ribs 128 is oriented perpendicularly to the reaction wall 116 to resist the offset load OL received by the reaction wall 116. Some of the first ribs 128 are directly coupled to the reaction wall 116, and other of the first ribs 128 are directly coupled to the frontal wall 126. In other words, at least some of the first ribs 128 are directly coupled to the reaction wall 116 to facilitate load transfer and management from the reaction wall 116 to the first ribs 128. Consequently, when the offset load OL is exerted on the vehicle 10, the first ribs 128 resist, absorb and/or redirect the offset load OL. The first layer 108 may include a plurality of locating holes 130 to facilitate assembly of the torque box 100 into the vehicle 10. The torque box 100 further includes a back-up wall 132 directly connected to at least some of the first ribs 128 to absorb some of the offset load OL. Each of the first ribs 128 is obliquely angled to the back-up wall 132 to facilitate redirecting the offset load OL. As a non-limiting example, the angle from each of the first ribs 128 to the back-up wall 132 may be between five degrees and forty-seven degrees to facilitate redirecting the offset load OL. The back-up wall 132 is parallel to the frontal wall 126 and, as a result, the frontal wall 126 and the back-up wall 132 can collectively absorb and manage some of offset load OL.

Figure 9:
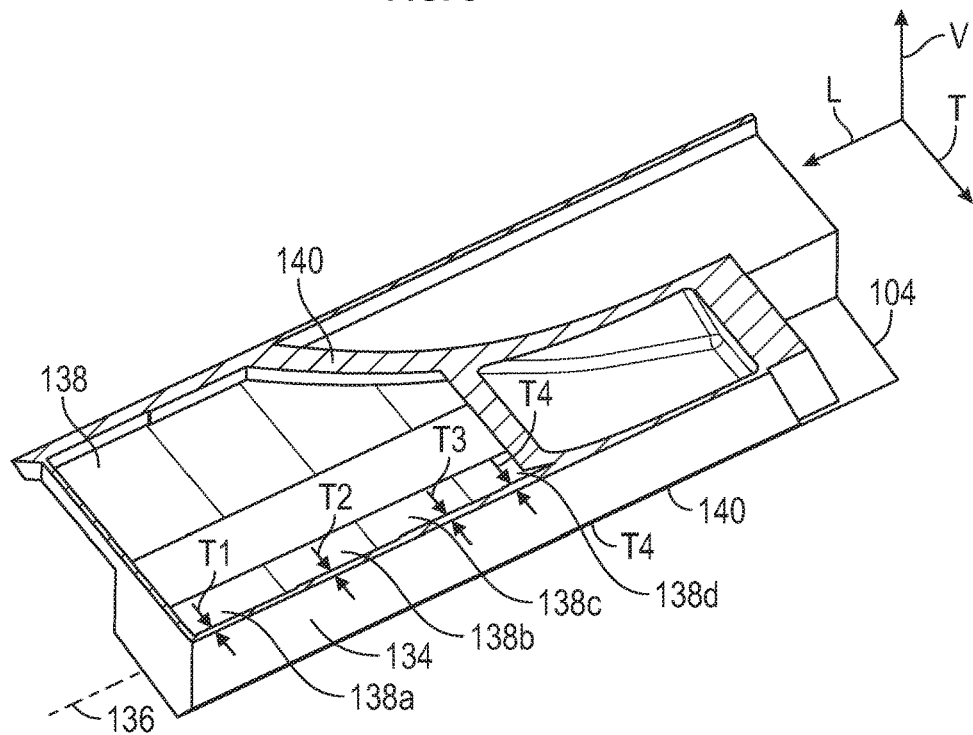
FIG. 9 is a schematic enlarged cross-sectional perspective view of the torque box, taken around area A of FIG. 8.

With reference to FIGS. 8 and 9, the first layer 108 of the torque box 100 further includes an energy-absorbing body 134 coupled to the box body 106. The energy-absorbing body 134 is elongated along a body axis 136 and is located in an outermost portion of the torque box 100 to absorb a straight load SL or a longitudinal component of the offset load OL. Accordingly, the body axis 136 is parallel to the longitudinal axis 118, and the body axis 136 is spaced from the longitudinal axis 118 along the transverse direction T. The thickness of the energy-absorbing body 136 varies along the body axis 136 to absorb energy from the straight load SL exerted on the torque box 100. In the depicted embodiment, the energy-absorbing body 134 includes a plurality of hollow portions 138 spaced apart from each other along the longitudinal direction and each having a different thickness to allow gradual absorption of energy from the straight load SL. In particular, the thickness of the energy-absorbing body 134 decreases in a stepped manner in the first direction L to efficiently manage energy stemming from the straight load SL. The hollow configuration of the hollow portions 138 also facilitate energy absorption. As a non-limiting example, the energy-absorbing body 134 includes a first hollow portion 138a, a second hollow portion 138b, a third hollow portion 138c, a fourth hollow portion 138d arranged in a row along the body axis 136. To efficiently transfer loads, the hollow portions 138 are directly coupled to each other. Specifically, the first hollow portion 138a is directly coupled to the second hollow portion 138b. The second hollow portion 138b is directly coupled to the third hollow portion 138c, and the third hollow portion 138c is directly coupled to the fourth hollow portion 138d. As discussed above, the thickness of the energy-absorbing body 134 decreases in a stepped manner in the longitudinal direction L to efficiently manage energy stemming from the straight load SL. Accordingly, the thickness (i.e., the first thickness T1) of the first hollow portion 138a is less than the thickness (i.e., the second thickness T2) of the second hollow portion 138b. The thickness (i.e., the second thickness T2) of the second hollow portion 138b is less than the thickness (i.e., the third thickness T3) of the third hollow portion 138c. The thickness (i.e., the third thickness T3) of the third hollow portion 138c is less than the thickness (i.e., the fourth thickness T4) of the fourth hollow portion 138d.

Figure 10:
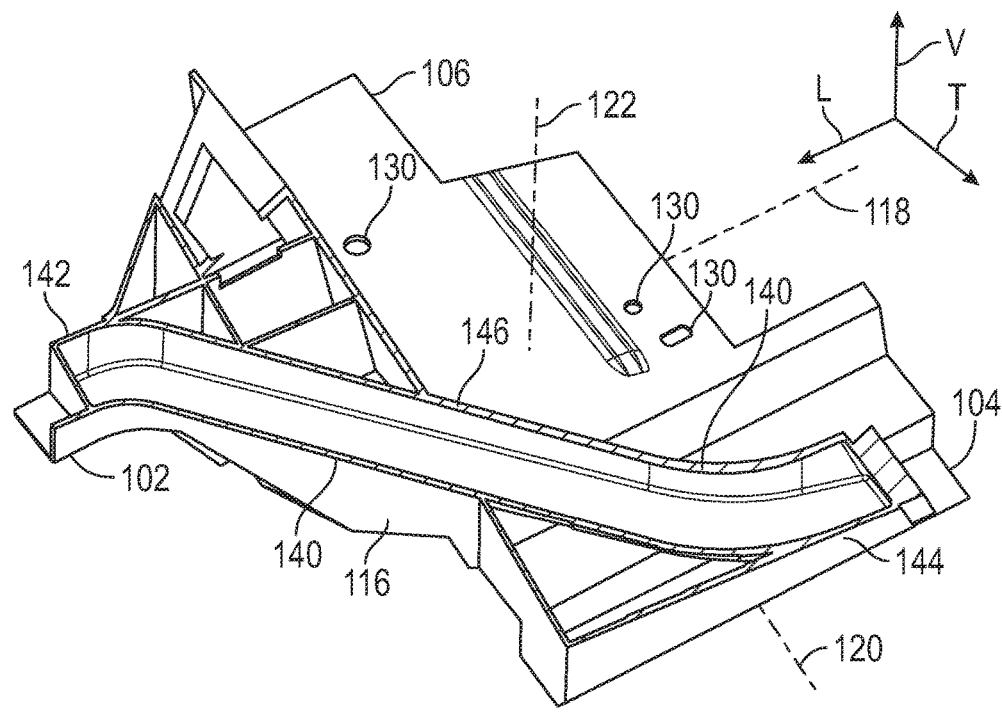
FIG. 10 is a schematic cross-sectional perspective view of the torque box, taken along section line 10-10 of FIG. 6.

With reference to FIG. 10, the second layer 110 of the torque box 100 includes a bridge rail 140 coupled to the box body 106. The bridge rail 140 is hollow and is configured to allow load transfer between the frame rail 16 and the rocker panel 14. To this end, the bridge rail 140 includes a first rail portion 142, a second rail portion 144, and a third rail portion 146 coupled between the first rail portion 142 and the second rail portion 144. The first rail portion 142 is directly coupled (and aligned with) the rail socket 102 to facilitate load transfer between the frame rail 16 (FIG. 2) and the bridge rail 140. The second rail portion 144 is directly coupled to (and aligned with) the rocker-panel socket 104 to facilitate load transfer between the rocker panel 14 (FIG. 2) and the bridge rail 140. The third rail portion 146 directly interconnects the first rail portion 142 and the second rail portion 144 to facilitate load transfer between the rocker panel 14 and the frame rail 16 through the bridge rail 140. The third rail portion 146 is obliquely angled relative to the longitudinal axis 118 to allow the load transfer between the frame rail 16 and the rocker panel 14. In other words, the majority of the bridge rail 140 (i.e., the third rail portion 146) is obliquely angled relative to the longitudinal axis 118 to allow the load transfer between the frame rail 16 and the rocker panel 14. As a non-limiting example, the angle from the third rail portion 146 to the longitudinal axis 118 is between five degrees and forty-seven degrees to allow the load transfer between the frame rail 16 and the rocker panel 14. The bridge rail 140 continuously connects the frame rail 16 to the rocker panel 14 (without panel breaks) to facilitate load transfer. The bridge rail 140 continues a closed section, and the thickness of the bridge rail 140 may be tunable to accommodate different needs. The bridge rail 140 has an elevation change to connect the frame rail 16 to the rocker panel 14. Accordingly, the first rail portion 142 is spaced apart from the second rail portion 144 along the third direction V. The first rail portion 142 is also spaced apart from the second rail portion 144 along the first direction L and the second direction T. Accordingly, the third rail portion 146 is obliquely angled relative to the longitudinal axis 118, the vertical axis 122, and the transverse axis 120 to facilitate load transfer between the frame rail 16 and the rocker panel 14.

Figure 11:
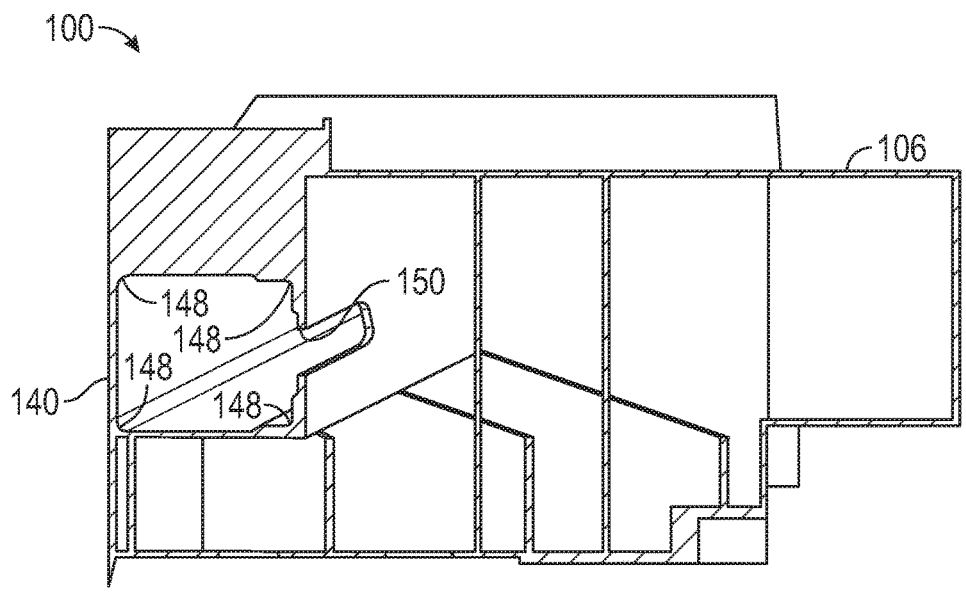
FIG. 11 is a schematic cross-sectional rear view of the torque box.

With reference to FIG. 11, the bridge rail 140 is a hollow, enclosed structure and includes a plurality of corners 148 (e.g., four corners 148). At least one of the corners 148 (e.g., two corners 14) is thicker than a remaining of the bridge rail 140 to enhance the structural integrity of the bridge rail 140. The corners 148 that are thickened can be made through casting or stamping. In addition, the bridge rail 140 may include one or more lightening holes 150 to minimize the mass of the torque box 100.

Figure 12:
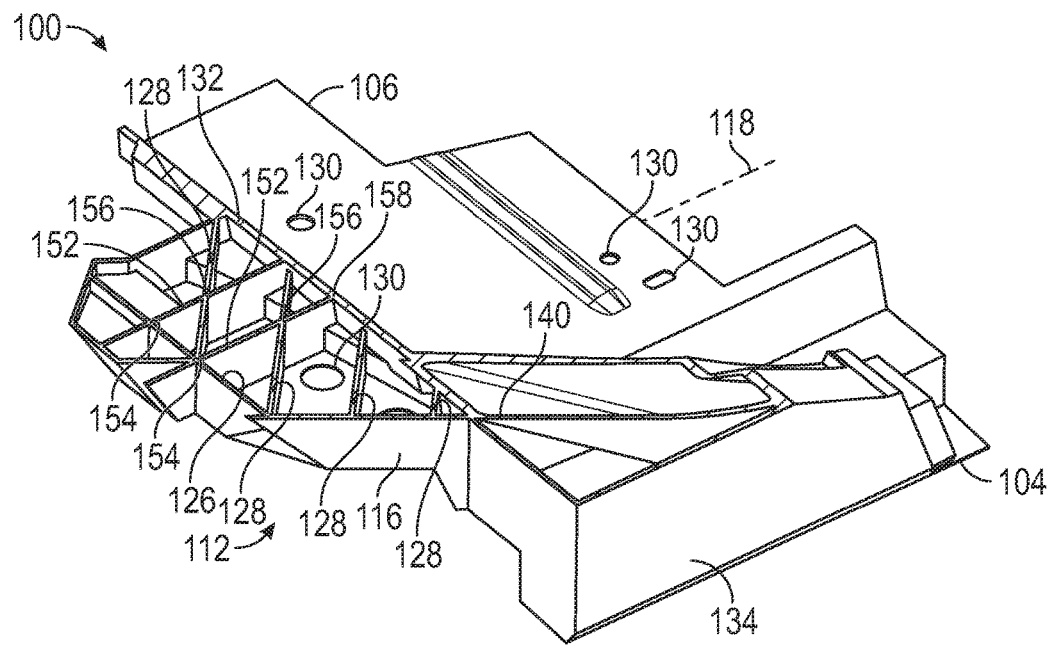
FIG. 12 is a schematic cross-sectional perspective view of the torque box, taken along section line 12-12 of FIG. 6.

With reference to FIG. 12, the third layer 112 of the torque box 100 includes a plurality of second ribs 152 directly coupled to the frontal wall 126 to enhance the structural integrity of the torque box 100. Each of the second ribs 152 is parallel to the longitudinal axis 118. At least one (e.g., two) of the second ribs 152 directly crosses (i.e., intersects) the frontal wall 126 at one or more first intersection points 154 to enhance the structural integrity of the torque box 100. At least one (e.g., two) of the second ribs 152 cross (i.e., intersect) one of the first ribs 128 at one or more second intersection points 156 to enhance the structural integrity of the torque box 100. At least one (e.g., two) of the second ribs 152 is directly coupled to the back-up wall 132 at third intersection points 158 to enhance the structural integrity of the torque box 100. Each of the second ribs 152 is perpendicular to the frontal wall 126 and the back-up wall 132 to absorb energy from the straight load SL.

Figure 13:
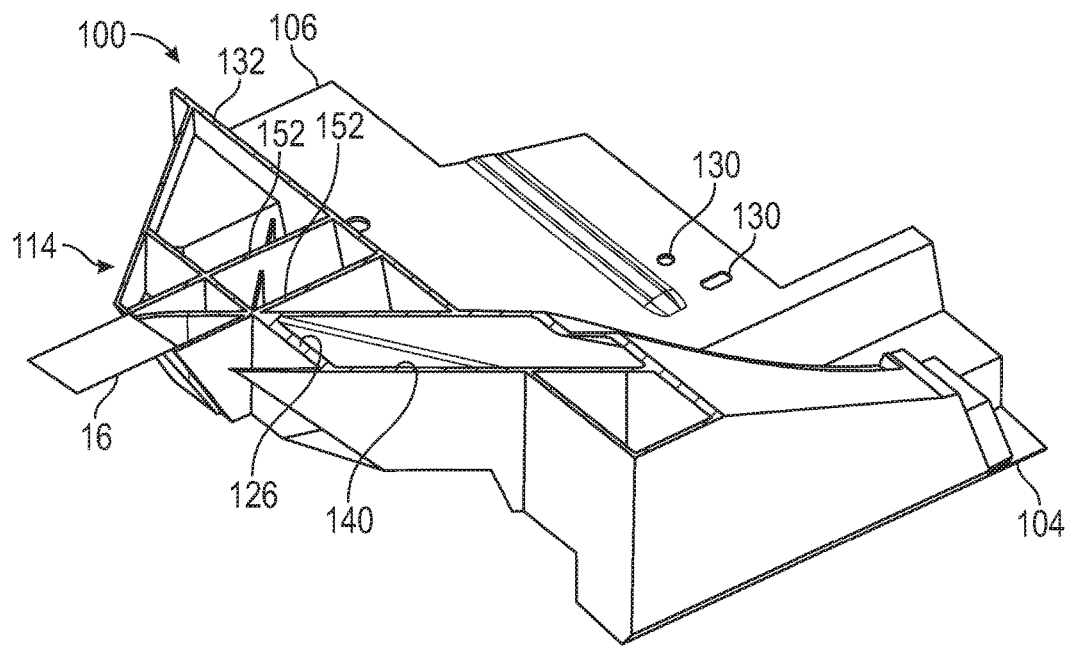
FIG. 13 is a schematic cross-sectional perspective view of the torque box, taken along section line 13-13 of FIG. 6.

With reference to FIG. 13, the fourth layer 114 includes part of the second ribs 152 and the bridge rail 140. As discussed above, the fourth layer 114 may also be referred to as the uppermost layer. The second ribs 152 are configured to absorb the energy from the straight load SL. To do so, the second ribs 152 directly interconnect the frontal wall 126 and the back-up wall 132.

While the best modes for carrying out the disclosure have been described in detail, those familiar with the art to which this disclosure relates will recognize various alternative designs and embodiments for practicing the disclosure within the scope of the appended claims.

What is claimed is:

1. A torque box, comprising:
    a box body extending along a longitudinal axis;
    a reaction wall coupled to the box body, wherein the reaction wall is obliquely angled relative to the longitudinal axis to receive an offset load;
    a plurality of ribs coupled to the reaction wall, wherein each of the plurality of ribs is oriented perpendicularly to the reaction wall to resist the offset load received by the reaction wall; and
    a bridge rail coupled to the box body, wherein the bridge rail is configured to allow load transfer between a frame rail and a rocker panel, and at least a portion of the bridge rail is obliquely angled relative to the longitudinal axis.

2. The torque box of claim 1, wherein the torque box includes a first layer, and the first layer includes the reaction wall and the plurality of ribs.

3. The torque box of claim 2, wherein the first layer includes a rocker-panel socket sized to receive the rocker panel.

4. The torque box of claim 3, wherein the torque box includes a rail socket sized to receive a frame rail, the rail socket is spaced apart from the rocker-panel socket along a first direction, the first direction is parallel to the longitudinal axis, the rail socket is spaced apart from the rocker-panel socket along a second direction, the second direction is parallel to a transverse axis, the second direction is orthogonal to the first direction, the rail socket is spaced apart from the rocker-panel socket along a third direction, the third direction is parallel to a vertical axis, and the third direction is orthogonal to the first direction and the second direction.

5. The torque box of claim 4, wherein the first layer includes a back-up wall, at least one of the plurality of ribs is directly coupled to the back-up wall, and each of the plurality of ribs is obliquely angled relative to the back-up wall.

6. The torque box of claim 5, wherein the first layer includes an energy-absorbing body coupled to the box body, wherein the energy-absorbing body is elongated along a body axis, the body axis is parallel to the longitudinal axis, and the body axis is spaced apart from the longitudinal axis along the second direction.

7. The torque box of claim 6, wherein the plurality of ribs is a plurality of first ribs, and the torque box further includes a plurality of second ribs, and each of the plurality of second ribs is parallel to the longitudinal axis.

8. The torque box of claim 7, wherein at least one of the plurality of second ribs crosses through at least one of the plurality of first ribs to enhance a structural integrity of the torque box, the torque box further includes a frontal wall directly coupled to the reaction wall, the reaction wall is obliquely angled to the frontal wall, the torque box further includes a back-up wall, the back-up wall is parallel to the frontal wall, at least one of the plurality of first ribs is directly coupled to the frontal wall, at least one of the plurality of first ribs is directly coupled to the back-up wall, at least one of the plurality of second ribs is directly coupled to the frontal wall, at least one of the plurality of second ribs is directly coupled to the back-up wall.

9. The torque box of claim 8, wherein the bridge rail includes corners, and at least one of the corners is thicker than a remaining of the bridge rail.

10. The torque box of claim 9, wherein the bridge rail has at least one lightening hole.

11. The torque box of claim 10, wherein the torque box further includes an energy-absorbing body coupled to the box body, the energy-absorbing body extends along a body axis, the longitudinal axis is parallel to the body axis, and a thickness of the energy-absorbing body varies along the body axis to absorb energy from a straight front load exerted on the torque box.

12. A vehicle, comprising:
a frame rail;
a rocker panel;
a torque box interconnecting the frame rail and the rocker panel such that an external load is transferable from the frame rail to the rocker panel through the torque box, wherein the torque box includes:
a box body extending along a longitudinal axis;
a reaction wall coupled to the box body, wherein the reaction wall is obliquely angled to the longitudinal axis such that the reaction wall is configured to receive an offset frontal load;
a plurality of ribs coupled to the reaction wall, wherein each of the plurality of ribs is oriented perpendicularly to the reaction wall to resist the offset frontal load received by the reaction wall;
a bridge rail coupled to the box body, wherein the bridge rail is configured to allow load transfer between the frame rail and the rocker panel;
a rail socket sized to receive the frame rail, wherein the frame rail is partially disposed inside the rail socket to couple the torque box to the frame rail;
a rocker-panel socket sized to receive the rocker panel, wherein the rocker panel is partially disposed inside the rocker-panel socket to couple the torque box to the rocker panel; and
wherein the bridge rail is coupled between the rail socket and the rocker-panel socket, wherein the bridge rail is obliquely angled relative to the longitudinal axis to allow the load transfer between the frame rail and the rocker panel.

13. The vehicle of claim 12, wherein the plurality of ribs is a plurality of first ribs, and the torque box further includes a plurality of second ribs, each of the plurality of second ribs is oriented parallel to the longitudinal axis.

14. The vehicle of claim 13, wherein at least one of the plurality of second ribs crosses through at least one of the plurality of first ribs to enhance a structural integrity of the torque box.

15. The vehicle of claim 14, wherein the bridge rail includes four corners, and each of the four corners is thicker than a remaining of the bridge rail.

16. The vehicle of claim 15, wherein the bridge rail has at least one lightening hole.

17. The vehicle of claim 16, wherein the torque box further includes an energy-absorbing body coupled to the box body, the energy-absorbing body extends along a body axis, the body axis is parallel to the longitudinal axis, and a thickness of the energy-absorbing body varies along the body axis to absorb energy from a straight front load exerted on the torque box.

18. The vehicle of claim 17, wherein a thickness of the energy-absorbing body decreases in a first direction in a stepped manner, the energy-absorbing body includes a first hollow portion, a second hollow portion, a third hollow portion, and a fourth hollow portion coupled to each other, the first hollow portion has a first thickness, the second hollow portion has a second thickness, the third hollow portion has a third thickness, the fourth hollow portion has a fourth thickness, the first thickness is less than the second thickness, the second thickness is less than the third thickness, the third thickness is less than the fourth thickness, the first hollow portion is directly coupled to the second hollow portion, the second hollow portion is directly coupled to the third hollow portion, and the third hollow portion is directly coupled to the fourth hollow portion.

19. The vehicle of claim 18, wherein the rail socket is spaced apart from the rocker-panel socket along the first direction, the first direction is parallel to the longitudinal axis, the rail socket is spaced apart from the rocker-panel socket along a second direction, the second direction is parallel to a transverse axis, the second direction is orthogonal to the first direction, the rail socket is spaced apart from the rocker-panel socket along a third direction, the third direction is parallel to a vertical axis, and the third direction is orthogonal to the first direction and the second direction.

20. The vehicle of claim 19, wherein the bridge rail includes a first rail portion, a second rail portion, and a third rail portion directly interconnecting the first rail portion and the second rail portion, the first rail portion is directly coupled to the rail socket, the second rail portion is directly coupled to the rocker-panel socket, the third rail portion is obliquely angled relative to the longitudinal axis, the first rail portion is spaced apart from the second rail portion along the third direction, the first rail portion is also spaced apart from the second rail portion along the first direction and the second direction, the third rail portion is obliquely angled to relative to the longitudinal axis, the torque box is a one-piece structure, the third rail portion is obliquely angled relative to the longitudinal axis, the vertical axis, and the transverse axis to facilitate load transfer between the frame rail and the rocker panel.

* * * * *